United States Patent
Dumler

(10) Patent No.: US 7,581,546 B2
(45) Date of Patent: Sep. 1, 2009

(54) BRUSH FOR APPLYING COSMETIC SUBSTANCES

(75) Inventor: Norbert Dumler, Ansbach (DE)

(73) Assignee: Geka Brush GmbH, Bechhofen-Waizendorf (DE)

( * ) Notice: Subject to any disclaimer, the term of this patent is extended or adjusted under 35 U.S.C. 154(b) by 100 days.

(21) Appl. No.: 11/500,478

(22) Filed: Aug. 8, 2006

(65) Prior Publication Data

US 2007/0033759 A1    Feb. 15, 2007

(30) Foreign Application Priority Data

Aug. 11, 2005   (EP)   .................... 05017437

(51) Int. Cl.
   A45D 40/26   (2006.01)
   A46B 1/00    (2006.01)
(52) U.S. Cl. .................... 132/218; 15/187; 15/207.2
(58) Field of Classification Search ............. 15/187, 15/207.2; 132/218
   See application file for complete search history.

(56) References Cited

U.S. PATENT DOCUMENTS

| | | | |
|---|---|---|---|
| 3,896,823 A * | 7/1975 | Spatz | 132/218 |
| 4,422,986 A | 12/1983 | Cole et al. | |
| 4,461,312 A * | 7/1984 | Gueret | 132/218 |
| 4,565,205 A | 1/1986 | Taylor et al. | |
| 4,660,582 A * | 4/1987 | Taylor | 132/218 |
| 5,853,011 A | 12/1998 | Gueret et al. | |
| 5,860,432 A * | 1/1999 | Gueret | 132/218 |
| 6,260,558 B1 * | 7/2001 | Neuner | 132/218 |
| 6,494,215 B2 * | 12/2002 | Gueret | 132/218 |
| 2005/0034740 A1 | 2/2005 | Eckers et al. | |
| 2005/0115011 A1 | 6/2005 | Petit | |

FOREIGN PATENT DOCUMENTS

EP    0 641 718 A    3/1995

* cited by examiner

*Primary Examiner*—Mark Spisich
(74) *Attorney, Agent, or Firm*—Browdy and Neimark, P.L.L.C.

(57) ABSTRACT

In a brush for applying cosmetic substances, especially a mascara brush or hair coloring brush, which is injection-molded from plastic as one piece and comprises a first section for connection to a rod and a second section, said second section having a main body from which a plurality of bristles protrude radially outward, provision is made for the main body to be designed as a polygon in cross section.

13 Claims, 2 Drawing Sheets

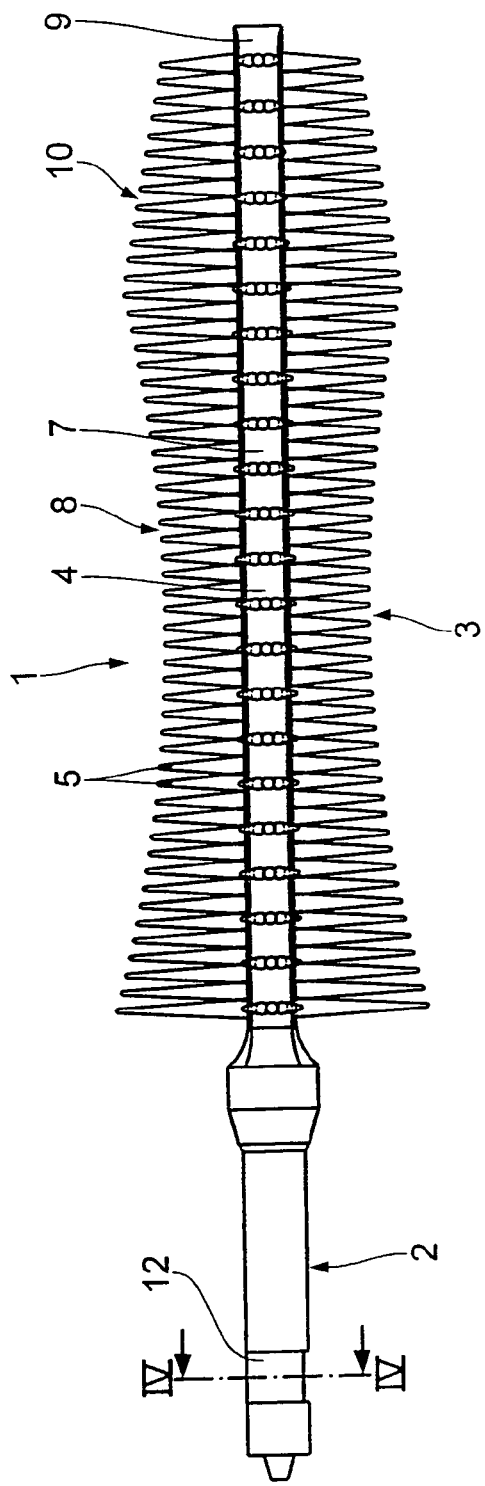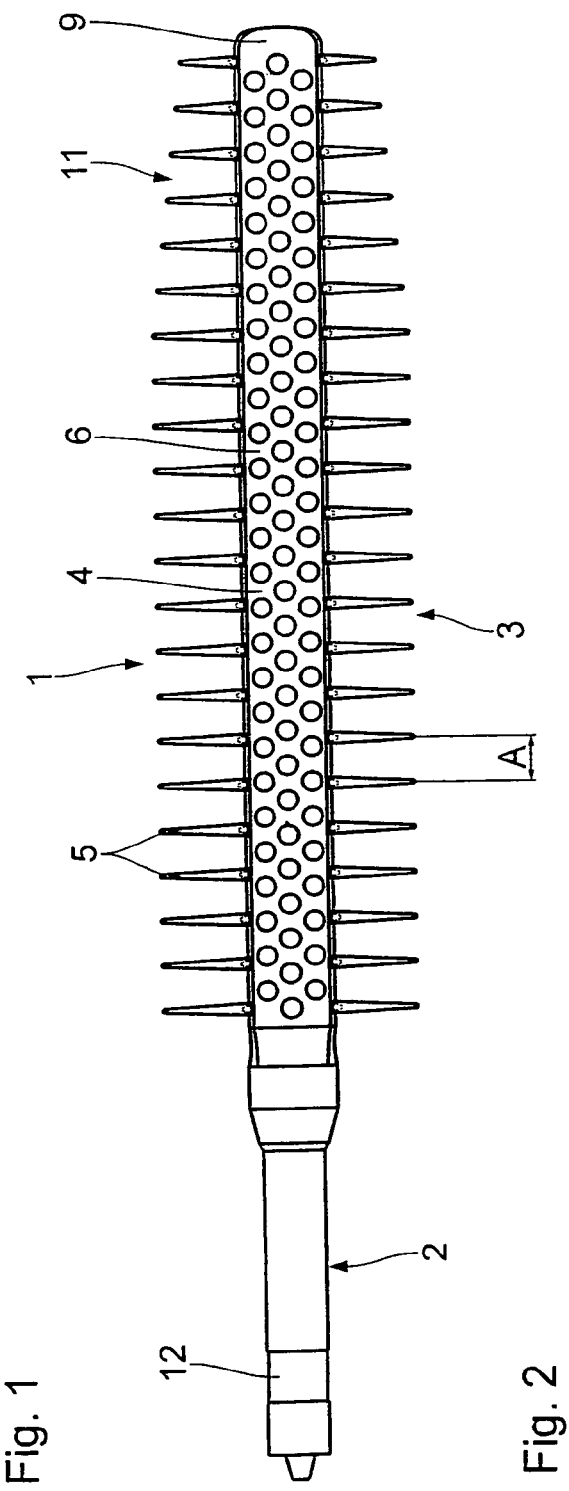
Fig. 1
Fig. 2

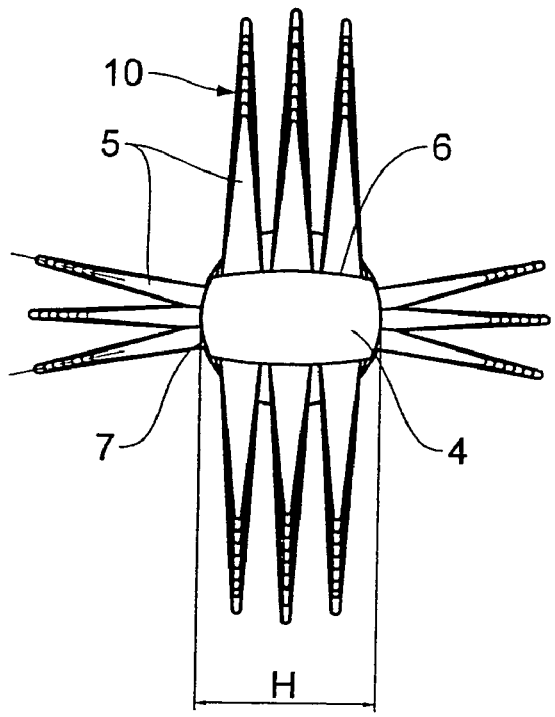
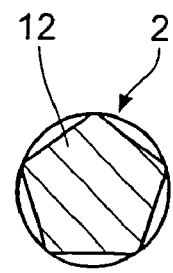
Fig. 3
Fig. 4
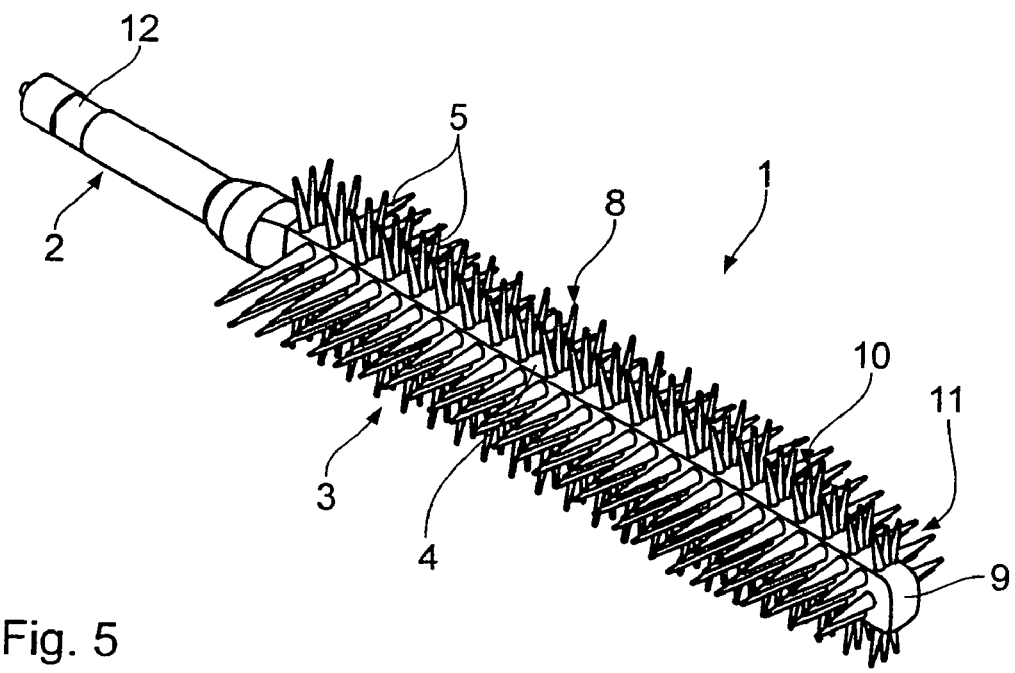
Fig. 5

BRUSH FOR APPLYING COSMETIC SUBSTANCES

BACKGROUND OF THE INVENTION

1. Field of the Invention

The invention relates to a brush for applying cosmetic substances, especially a mascara brush or hair coloring brush, which is injection-molded from plastic as one piece and comprises a first section for connection to a rod and a second section, said second section having a main body from which a plurality of bristles protrude radially outward.

2. Background Art

Conventionally, brushes of this type have been produced in such a way that bristles were secured between helically twisted wires. Due to the nature of this production technique, the design options for forming and arrangement of the bristles have been limited.

In the case of brushes that are produced by injection molding, in contrast, consideration needs to be given essentially only to the fact that it needs to be removable from the mold, whereas in other respects, a very extensive variety of design options exists.

SUMMARY OF THE INVENTION

With this as the starting point, the invention is based on the object of creating a brush under utilization of the possibilities that are available with injection-molding that has optimal application and combing properties and that is characterized by a pleasant and advantageous manageability for the user.

This object is met in such a way that the main body is designed as a polygon in cross section, that the diameter of the envelope (H) of the cross-sectional configuration of the main body is between 1.5 mm and 6.0 mm, preferably approximately 2.5 mm, and that the bristle density at the periphery of the bristle rings is 5 to 35 bristles per 360°.

Provision is made in particular for the main body to have different side lengths in cross section, to be rectangular in particular, wherein a first group of bristles extends away from the end walls of the main body and a second groups of bristles extends away from the side walls of the main body.

It is accordingly possible to provide the different sides of the polygon, ergo especially the end walls and side walls of a rectangle, with different bristle configurations, which accordingly have different combing, application and transfer properties.

To take advantage of the given specific properties, the person handling the brush only needs to turn it about the respective angle of the polygon, i.e., for example by 90°.

The bristles that extend away from the end walls may advantageously have substantially identical lengths and optionally a tapered envelope curve only in the region of the free end of the main body.

On the other hand, the bristles that extend away from the side walls of the main body may have an envelope curve at least on one side in such a way that it has a concave curvature viewed in the longitudinal direction.

The main body could alternatively also be formed in cross section by a polygon with identical side lengths.

The envelope curve may be designed, in the region of the free end of the main body, generally tapered toward the free end, as this is known per se from twisted brushes.

The bristles preferably have a root width <0.6 mm, are round in cross section and are provided with a conical shape.

Alternatively, the bristles may have a cylindrical configuration and be pointed conically or chisel-shaped only in the region of their tips.

The bristles are advantageously arranged about the main body in bristle-ring-like configurations, in such a way that these bristles in their bristle-ring-like configuration, may have a circular envelope in cross section, and in such a way that each bristle ring comprises eight bristles, for example.

To attain a high trim density, the bristles are advantageously disposed closely spaced in their root region.

The bristles of consecutive bristle rings in the longitudinal direction may be angularly offset relative to each other in such a way that the bristle roots have a kind of most dense sphere packing in cross section, i.e., in other words, the maximally possible trim density.

Additionally, provision may be made for the section that is provided for connection to a rod to be designed, along at least a part of it pentagonal in cross section, so that when the rod is affixed by means of spot press-fitting or thermal spot welding, the press-fitting tool or welder's stamp finds an opposite surface in each case that is approximately perpendicular to its contact pressure movement.

The invention will be explained in more detail below based on a preferred example embodiment in conjunction with the drawings.

BRIEF DESCRIPTION OF THE DRAWINGS

FIG. 1 shows a side view of an inventive brush,

FIG. 2 shows a side view shifted by 90° relative to FIG. 1,

FIG. 3 shows a section through the brush in the region of the main body,

FIG. 4 shows a section through the brush along the line IV-IV in FIG. 1, and FIG. 5 shows a perspective view of an inventive brush.

DESCRIPTION OF THE PREFERRED EMBODIMENT

An inventive brush 1 shown in the drawing comprises a first section 2 for connection to a rod and a second section 3 having a main body 4 from which a plurality of bristles 5 protrude radially outward.

As is apparent especially from FIG. 3, the main body 4 has a substantially rectangular cross section with side walls 6 and end walls 7 wherein the width of side walls 6 are greater than that of end walls 7.

As can be seen from FIG. 1, the side walls 6 have a trim composed of bristles 5, whose envelope curve viewed in the longitudinal direction has a concave recess 8, and at its free end 9 conically tapers towards this free end 9 at 10. The bristles 5 have a conical basic shape. From FIG. 2 it is apparent that the bristles are spaced closely together, in such a way that contiguous rows of bristles extending in the longitudinal direction of the main body are staggered, so that the available space is optimally used and a kind of densest sphere packing is created.

The bristles 5 on the end walls 7 as can be seen from FIGS. 1-3 and 5 are also arranged in a plurality of rows which extend in the longitudinal direction of the main body 4 and have a substantially cylindrical envelope curve having a conical tapering section 11 toward the free end 9.

As a result of the above-described different design of the trim composed of bristles 5 on the end walls 7 and side walls 6, different transfer, application, and combing properties are attained, so that the user can chose between these individual properties by turning the brush by 90°.

The first section 2 has a region 12, which—as is apparent from FIG. 4—is pentagonal in cross section, so that during the process of affixing it to a rod that overlaps this section in a sleeve-like manner, a thermal press-fitting tool will encounter a substantially perpendicular opposite surface.

What is claimed is:

1. A brush for applying cosmetic substances, especially a mascara brush or hair coloring brush, which is injection-molded from plastic as one piece comprising:
    a first section for connection to a rod and a second section, said second section having a main body having side and end walls, wherein the width of the side walls are greater than that of the end walls,
    wherein both the side walls and the end walls each have a plurality of rows of bristles, each row of bristles extends in a longitudinal direction of the main body and each bristle protrudes radially outward from the main body,
    wherein the main body (4) is a polygon in cross section, a diameter of an envelope (H) of the cross-sectional configuration of the main body is between 1.5 and 6.0 mm and the bristle density at the periphery of bristle rings deposed around the main body is up to 35 bristles per 360°,
    wherein different bristle configurations are provided on the side walls and on the end walls, a first tapered envelope curve (11) is formed by ends of the row of bristles on the end walls (7), a second envelope curve (8) is formed by ends of the row of bristles (5) on the side walls (6), and the first tapered envelop curve (11) is different from the second envelope curve (8),
    wherein the bristles (5) on the end walls (7) have a substantially identical length and the first tapered envelope curve (11) are located only in a region of a free end (9) of the main body (4).

2. A brush according to claim 1, wherein the second envelope curve (8) of the bristles extending away from the side walls (6) when viewed in the longitudinal direction have a concave curvature.

3. A brush according to claim 1, wherein the second envelope curve (8) is formed tapered in a region of the free end (9) toward the free end (9).

4. A brush according to claim 1, wherein the bristles (5) have a root width <0.6 mm and are created round in cross section and have a conical shape.

5. A brush according to claim 4, wherein a bristle spacing (A) is between 0.20 mm and 2.0 mm.

6. A brush according to claim 4, wherein the bristles (5) have a cylindrical configuration and are pointed conically or chisel-like only in regions of the bristles' tips.

7. A brush according to claim 1, wherein the bristle rings each have a circular envelope in cross section.

8. A brush according to claim 1, wherein each of the bristle rings comprise eight bristles (5).

9. A brush according to claim 8, wherein the bristles (5) of the bristle rings that are consecutive in the longitudinal direction of the main body are angularly offset relative to each other so that the bristle roots have a dense sphere packing viewed in cross section.

10. A brush according to claim 1, wherein the root sections of the bristles (5) are spaced closely together.

11. A brush according to claim 1, wherein the first section (2) provided for connection to a rod is designed pentagonal in cross section along at least a part of it (region 12).

12. A brush according to claim 1, wherein there are at least three rows of bristles protruding outward from said end walls.

13. The brush according to claim 1, wherein the diameter of the envelope (H) is approximately 2.5 mm.

* * * * *